(12) United States Patent
Muendel et al.

(10) Patent No.: US 11,502,477 B2
(45) Date of Patent: Nov. 15, 2022

(54) IN-FIBER RETROREFLECTOR

(71) Applicant: Lumentum Operations LLC, San Jose, CA (US)

(72) Inventors: Martin H. Muendel, Oakland, CA (US); Richard D. Faulhaber, San Carlos, CA (US); Michael Lovelady, Mountain View, CA (US); James J. Morehead, Oakland, CA (US); Andreas Oehler, Zurich (CH)

(73) Assignee: Lumentum Operations LLC, San Jose, CA (US)

( * ) Notice: Subject to any disclaimer, the term of this patent is extended or adjusted under 35 U.S.C. 154(b) by 164 days.

(21) Appl. No.: 16/876,708

(22) Filed: May 18, 2020

(65) Prior Publication Data
US 2021/0265801 A1     Aug. 26, 2021

Related U.S. Application Data

(60) Provisional application No. 62/981,872, filed on Feb. 26, 2020.

(51) Int. Cl.
*H01S 3/094*     (2006.01)
*H01S 3/067*     (2006.01)

(52) U.S. Cl.
CPC .. *H01S 3/094053* (2013.01); *H01S 3/094003* (2013.01); *H01S 3/094015* (2013.01); *H01S 3/06729* (2013.01); *H01S 3/06733* (2013.01); *H01S 3/06745* (2013.01)

(58) Field of Classification Search
CPC .......... H01S 3/06745; H01S 3/094015; H01S 3/06729; H01S 3/08068; G02B 6/262
See application file for complete search history.

(56) References Cited

U.S. PATENT DOCUMENTS

| | | | | |
|---|---|---|---|---|
| 4,403,273 | A | * 9/1983 | Nishioka | ............ A61B 1/00096 385/115 |
| 5,121,404 | A | * 6/1992 | Aoshima | ............. H01S 3/09415 372/100 |
| 5,402,508 | A | * 3/1995 | O'Rourke | ............ G01N 21/255 385/115 |
| 5,422,645 | A | * 6/1995 | Nettleton | ................ G01S 17/74 398/108 |

(Continued)

FOREIGN PATENT DOCUMENTS

| | | | |
|---|---|---|---|
| AU | 2020101132 A4 | * 8/2020 | |
| CN | 107968310 A | * 4/2018 | ............. H01S 3/067 |

(Continued)

*Primary Examiner* — Joshua King
(74) *Attorney, Agent, or Firm* — Harrity & Harrity, LLP

(57) ABSTRACT

An optical fiber may include a core in which core-guided light generated by one or more light sources propagates along a length of the at least one optical fiber, one or more claddings, surrounding the core, to guide cladding-guided light generated by the one or more light sources along the length of the at least one optical fiber, and a reflector structure machined into the at least one optical fiber. The reflector structure may include multiple angled facets arranged at one or more respective angles relative to an axis of the optical fiber to reflect at least a portion of the core-guided light and/or the cladding-guided light passing through the optical fiber.

20 Claims, 7 Drawing Sheets

(56) References Cited

U.S. PATENT DOCUMENTS

| | | | | |
|---|---|---|---|---|
| 5,455,879 A * | 10/1995 | Modavis | ............... | G02B 6/4203 385/33 |
| 5,708,735 A * | 1/1998 | Benson | ................ | G01N 21/553 385/12 |
| 5,764,840 A * | 6/1998 | Wach | ................... | G02B 6/4203 385/124 |
| 5,812,724 A * | 9/1998 | Ohtsu | .................... | G02B 6/245 385/127 |
| 5,878,178 A * | 3/1999 | Wach | ..................... | G02B 6/262 385/85 |
| 5,953,477 A * | 9/1999 | Wach | ................... | G02B 6/4203 385/115 |
| 6,031,958 A * | 2/2000 | McGaffigan | ......... | G02B 6/0096 362/555 |
| 6,144,791 A * | 11/2000 | Wach | ................ | G02B 6/29368 385/124 |
| 6,160,948 A * | 12/2000 | McGaffigan | ..... | B29D 11/00663 362/555 |
| 6,324,326 B1 * | 11/2001 | Dejneka | ............... | G02B 6/1228 359/341.1 |
| 6,337,946 B1 * | 1/2002 | McGaffigan | ......... | G02B 6/4298 362/555 |
| 6,625,195 B1 * | 9/2003 | Henrichs | ............. | H01S 5/18341 372/96 |
| 6,748,137 B2 * | 6/2004 | Wolak | .................. | G02B 6/4203 385/38 |
| 6,792,008 B2 * | 9/2004 | Wolak | .................. | G02B 6/4207 385/33 |
| 7,043,104 B1 * | 5/2006 | Bratkovski | ............ | G01Q 60/22 385/12 |
| 7,110,108 B2 * | 9/2006 | Puppels | ................. | G02B 6/262 356/301 |
| 7,502,534 B2 * | 3/2009 | Lee | ...................... | H04N 9/3152 385/36 |
| 7,542,488 B2 * | 6/2009 | Schlueter | ............ | H01S 3/06708 385/127 |
| 8,724,945 B2 * | 5/2014 | Gapontsev | .......... | H01S 3/06704 385/38 |
| 9,166,365 B2 * | 10/2015 | Park | ........................ | G02B 6/32 |
| 10,090,631 B2 | 10/2018 | Hou et al. | | |
| 10,530,976 B2 * | 1/2020 | Takeuchi | ................ | G02B 23/26 |
| 2002/0159693 A1 * | 10/2002 | Wolak | .................. | G02B 6/4207 385/33 |
| 2002/0186742 A1 * | 12/2002 | Flint | ...................... | G02B 6/262 372/92 |
| 2003/0048987 A1 * | 3/2003 | Saito | .................... | G02B 6/4203 385/33 |
| 2003/0113231 A1 * | 6/2003 | Karube | ................ | G01N 21/274 422/82.05 |
| 2009/0041061 A1 * | 2/2009 | Shkunov | ............ | H01S 3/06704 65/382 |
| 2009/0080469 A1 * | 3/2009 | Nikolajsen | ........... | G02B 6/2817 385/127 |
| 2009/0180511 A1 * | 7/2009 | Muendel | ............. | G02B 6/2552 264/1.24 |
| 2009/0232453 A1 * | 9/2009 | Muendel | ................ | G02B 6/262 385/43 |
| 2011/0026875 A1 * | 2/2011 | Bowen | .................. | G02B 6/262 385/47 |
| 2017/0371097 A1 * | 12/2017 | Wu | .......................... | G02B 6/14 |

FOREIGN PATENT DOCUMENTS

| | | | | |
|---|---|---|---|---|
| CN | 109478754 A | * | 3/2019 | ............ H01S 3/0621 |
| CN | 111817118 A | * | 10/2020 | |
| EP | 3460544 A1 | * | 3/2019 | |
| JP | H09126719 A | * | 5/1997 | |
| TW | I230812 B | * | 4/2005 | |
| WO | WO-03088435 A1 | * | 10/2003 | ............. H01S 5/142 |
| WO | WO-2008093448 A9 | * | 11/2009 | ............ A61B 5/0066 |

* cited by examiner

IN-FIBER RETROREFLECTOR

RELATED APPLICATION

This application claims the benefit of U.S. Provisional Patent Application No. 62/981,872, entitled "IN-FIBER RETROREFLECTOR," filed Feb. 26, 2020, the content of which is incorporated by reference herein in its entirety.

TECHNICAL FIELD

The present disclosure generally relates to an in-fiber reflector structure, and more particularly, to a reflector structure machined into an optical fiber to reflect at least a portion of core-guided light and/or cladding-guided light passing through the optical fiber.

BACKGROUND

Optical pumping refers to processes in which pump light is injected into a gain medium in order to electronically excite the gain medium and/or some constituents of the gain medium into other (e.g., higher) energy levels. In the context of a laser or a laser amplifier, the goal of optical pumping is to achieve a population inversion in the gain medium and thereby obtain optical amplification via stimulated emission for a particular range of optical wavelengths (e.g., a particular gain bandwidth). In particular, when the number of particles in one excited state exceeds the number of particles in a ground state or a less-excited state, population inversion is achieved and the medium can act as a laser or an optical amplifier. For example, in a multi-clad optical fiber (e.g., a double-clad fiber, a triple-clad fiber, and/or the like), laser light propagates in a core doped with ions of a rare-earth element, and the core is surrounded by an inner cladding in which pump light propagates. The pump light is generally restricted to the inner cladding by an outer cladding with a lower refractive index, and the pump light may also partly propagate in the core where the pump light can be absorbed by the laser-active ions. Accordingly, the inner cladding guides the pump light to be absorbed in the doped core for laser light amplification along the entire fiber length.

SUMMARY

According to some implementations, an optical assembly may include: one or more light sources; and at least one optical fiber that comprises: a core in which core-guided light generated by the one or more light sources propagates along a length of the at least one optical fiber; one or more claddings, surrounding the core, to guide cladding-guided light generated by the one or more light sources along the length of the at least one optical fiber; and a reflector structure machined into the at least one optical fiber, wherein the reflector structure comprises multiple angled facets that are arranged at one or more respective angles relative to an axis of the at least one optical fiber to reflect at least a portion of one or more of the core-guided light or the cladding-guided light passing through the at least one optical fiber.

According to some implementations, a reflector structure may include: multiple angled facets machined into a tip of a multi-clad optical fiber, wherein the multiple angled facets are arranged at an angle in a range from 30° to 40° relative to an axis of the multi-clad optical fiber to reflect at least a portion of core-guided light or cladding-guided light after a first pass through the multi-clad optical fiber; and a central pass-through port, formed at a junction of the multiple angled facets, to transmit at least a portion of the core-guided light into a core of the multi-clad optical fiber after the first pass and one or more subsequent passes through the multi-clad optical fiber.

According to some implementations, a method may include: machining multiple angled facets into a tip of a multi-clad optical fiber, wherein the multiple angled facets are machined such that the multiple angled facets are formed at respective angles in a range from 30° to 40° relative to an axis of the multi-clad optical fiber; and heating surfaces of the multiple angled facets to a temperature at which the surfaces of the multiple angled facets re-flow and smooth via surface tension.

DETAILED DESCRIPTION

Figure 1A:
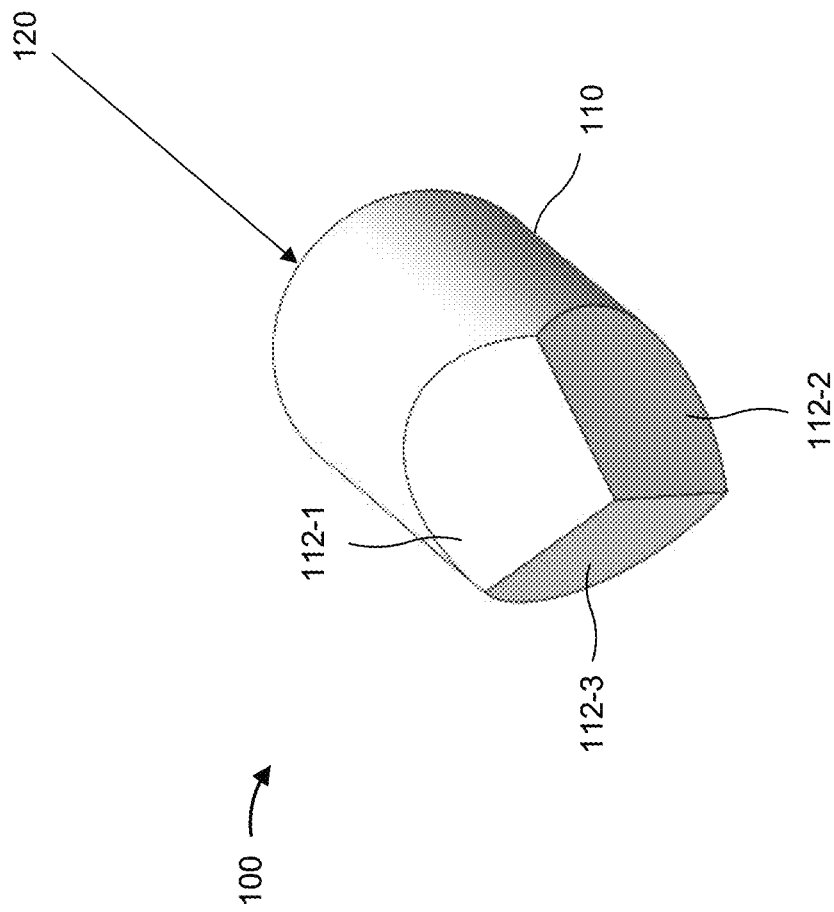
FIGS. 1A-1C are diagrams of one or more example implementations of a reflector structure machined into an optical fiber.

The following detailed description of example implementations refers to the accompanying drawings. The same reference numbers in different drawings may identify the same or similar elements.

Fiber lasers are a class of lasers that provide significant advantages, including efficiency and practicality, in comparison with other laser types such as free-space lasers. With the advent of multi-clad optical fiber (e.g., double-clad fiber, triple-clad fiber, and/or the like), fiber lasers have been scaled to kilowatt (kW) power levels. In a multi-clad optical fiber, pump light propagates in a relatively large inner cladding, which is typically 125 to 600 micrometers in diameter, and laser light propagates in a much smaller core, which is typically 5 to 100 micrometers in diameter. The core is generally doped with ions of a rare-earth element, such as Ytterbium, and is surrounded by the inner cladding, which guides the pump light to be absorbed in the doped core for laser light amplification along the entire fiber length. Ideally, at the output of the laser, no light will be propagating in the inner cladding, and all of the output laser beam will originate from the core. In some fiber laser systems, to have exclusively core light propagating between components or between amplification stages may be similarly desirable.

In practice, however, the output of a fiber laser or amplifier based on a multi-clad fiber typically includes some core-guided light and some cladding-guided light. The cladding-guided light may contain residual unabsorbed pump light, laser light that has escaped from the core into the cladding (e.g., due to splice loss, scattering or spontaneous emission in the core), and/or the like. The cladding-guided light may contain optical beams at a large range of divergence angles and various wavelengths, depending on their source(s) and the construction of the laser system. In various applications, the cladding-guided light may be deleterious, and is therefore often removed, or "stripped", from the fiber using a clad-light stripper following a single pass through one or more active fibers. However, safely and efficiently removing the cladding light represents a significant technological challenge. For example, the stripped cladding-guided light is typically converted to heat, and care must be taken to avoid overheating fiber coatings or other components such as ferrules, splice protectors, and/or the like. Furthermore, removing the cladding-guided light after a single pass through the one or more optical fibers may reduce pumping efficiency because the residual unabsorbed pump light is essentially discarded after the first pass.

Some implementations described herein relate to an in-fiber retroreflector that may be micromachined into an optical fiber to serve as a total-internal reflection (TIR) structure arranged to reflect light traveling in the optical fiber. In some implementations, the in-fiber retroreflector can be used with a double-clad active fiber, a triple-clad active fiber, a multi-clad active fiber, and/or the like in order to double-pass pump power traveling within a pump guiding layer (e.g., a cladding layer), while a signal core (with a thinner cladding layer) extends beyond the in-fiber retroreflector and allows the signal to be transmitted without retroreflection. In this way, the in-fiber retroreflector may serve to mitigate the potential deleterious effects of cladding-guided light that may contain residual unabsorbed pump light and/or laser light that has escaped from the core into the cladding by blocking the cladding-guided light from accompanying amplified signal light and/or reaching a signal source. Furthermore, in contrast to clad-light strippers that typically remove unabsorbed pump light after one pass through one or more active fibers, the in-fiber retroreflector described herein does not remove the unabsorbed pump light but rather retroreflects the unabsorbed pump light. In this way, the (unabsorbed) retroreflected pump light has another chance to be absorbed in the fiber core, thereby improving performance.

Figure 1B:
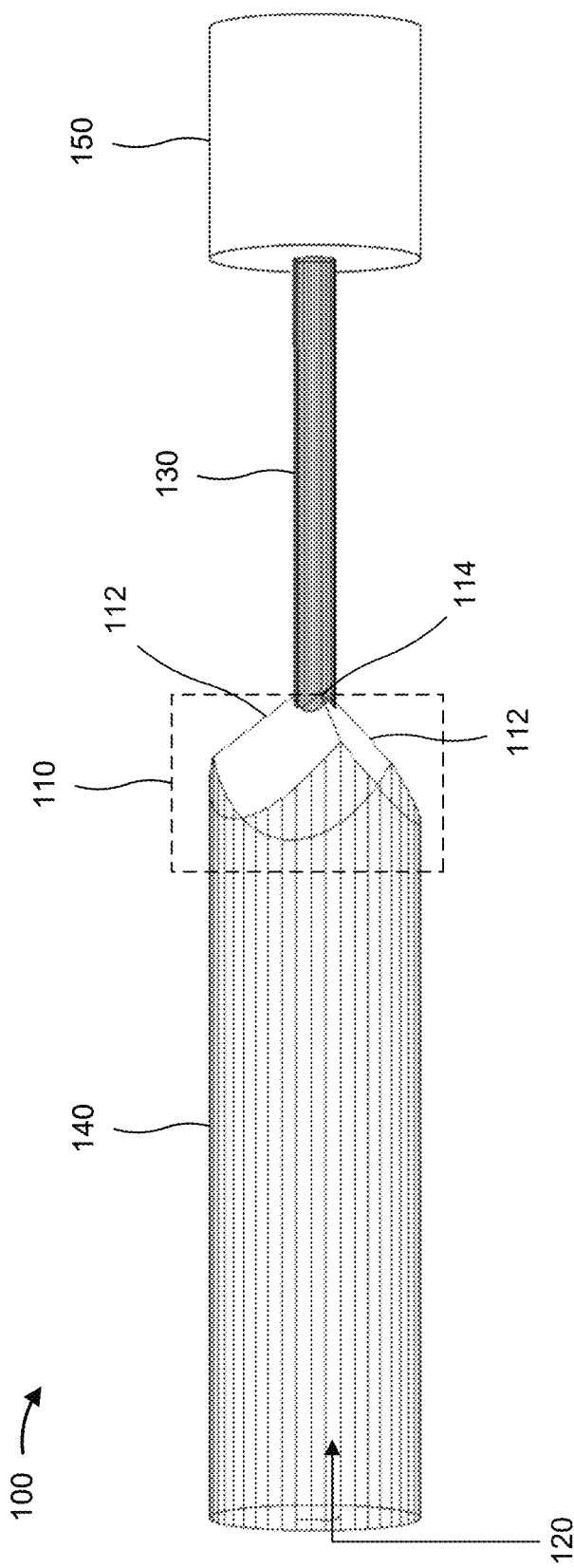
Figure 1C:
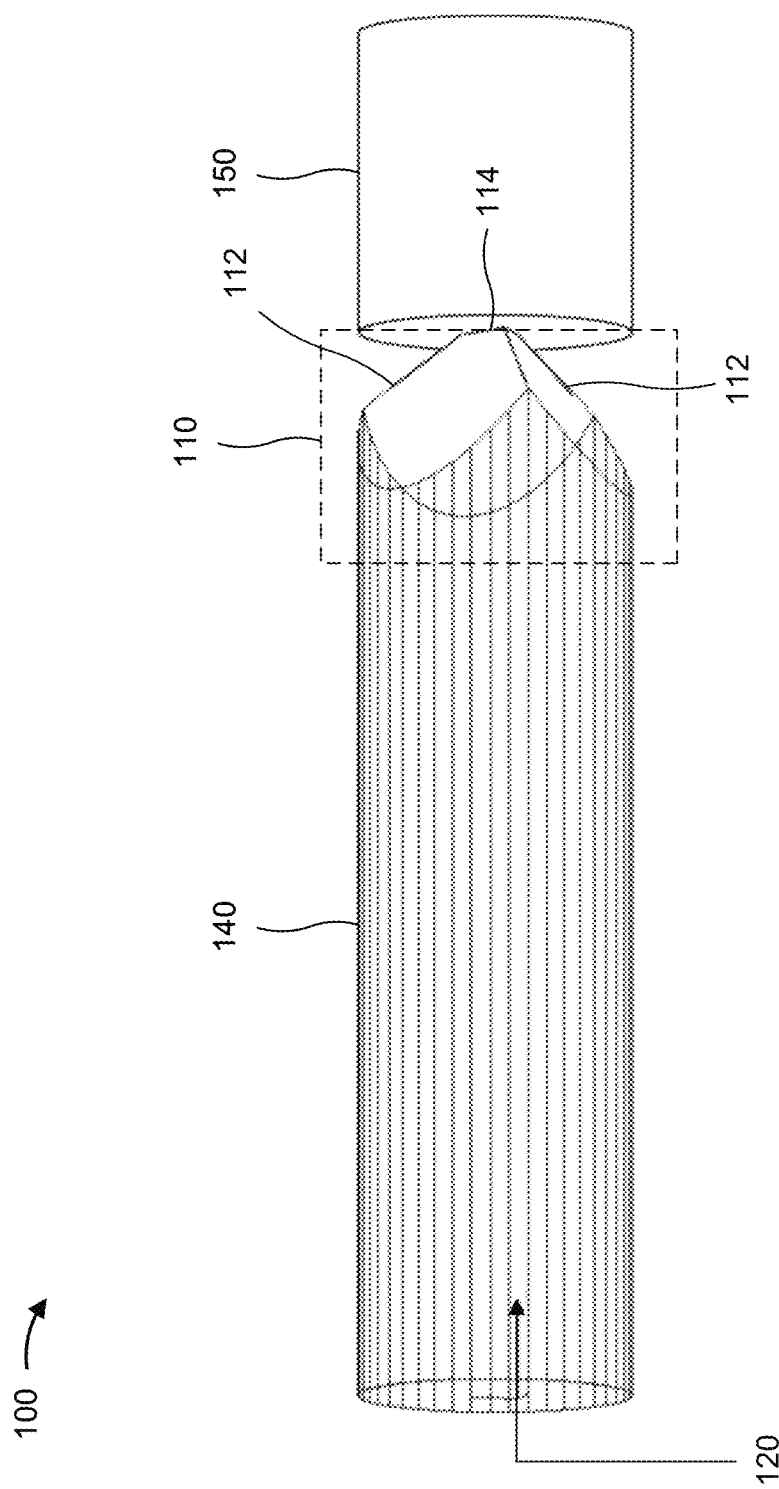

FIGS. 1A-1C are diagrams of one or more example implementations 100 of an in-fiber reflector structure 110 machined into an optical fiber. For example, as described herein, the in-fiber reflector structure 110 has multiple planar or near-planar facets 112 that are arranged to reflect at least a portion of core-guided light and/or cladding-guided light passing through the optical fiber. In general, FIG. 1A illustrates a perspective view of the reflector structure 110 in a design with three facets and no output port, and FIGS. 1B-1C illustrate side views of the reflector structure 110 in designs where the reflector structure 100 has a central pass-through port.

Accordingly, as described herein, the reflector structure 110 may be machined into an optical fiber arranged to receive input light 120 generated by one or more light sources. For example, in some implementations, the optical fiber may include a core in which core-guided light (e.g., signal light and/or the like) generated by the one or more light sources propagates along a length of the optical fiber and one or more claddings that surround the core to guide cladding-guided light (e.g., pump light) generated by the one or more light sources along the length of the optical fiber. Furthermore, the reflector structure 110 may be machined into the optical fiber, with multiple angled facets 112 that are arranged at one or more respective angles relative to an axis of the optical fiber to reflect at least a portion of the core-guided light and/or the cladding-guided light passing through the optical fiber. Accordingly, as described in further detail herein, the reflector structure 110 may be a TIR structure micromachined into an optical fiber (e.g., a double-clad fiber, a triple-clad fiber, a multi-clad fiber, and/or the like) to serve as a reflector for light traveling in the optical fiber in order to double-pass pump power traveling within the pump guiding layer (e.g., one or more claddings surrounding the core), while the signal-guiding core (with a thinner cladding layer) extends beyond the reflector structure 110 and allows the signal carried in the core to be transmitted without retroreflection. Additionally, or alternatively, in some implementations, the multiple facets 112 of the reflector structure 110 may have dichroic coatings to reflect or retroreflect wavelengths in a certain range (e.g., pump light or cladding-guided light) and to transmit or dump wavelengths in another range (e.g., signal light or core-guided light that may be trapped in the pump-guiding layer(s) rather than the signal core).

For example, as shown in FIG. 1A, a tip of a round optical fiber may be micromachined to form a reflector structure 110 that has three (3) facets 112-1, 112-2, 112-3 inclined at respective angles relative to an axis of the optical fiber. For example, in some implementations, the facets 112-1, 112-2, 112-3 may be inclined at an angle in a range from 30° to 40°. In some implementations, the three facets 112-1, 112-2, 112-3 may be mutually perpendicular and may be inclined at an angle of $\sin^{-1}(1/\sqrt{3}) \approx 35.3°$. In other words, relative to the axis of the optical fiber, the three facets 112-1, 112-2, 112-3 may be arranged at an angle $\theta$ such that $\sin \theta = 1/\sqrt{3}$, whereby the three angled facets 112-1, 112-2, 112-3 are mutually orthogonal and form a corner-cube retroreflector with TIR. Accordingly, in a silica glass fiber in a 1 micron to 2 micron wavelength range, where the refractive index near 1 micron is about 1.45, the minimum TIR angle is $\sin^{-1}(1/1.45) \approx 43.6°$. In this regard, the TIR margin is $90°-35.3°-43.6°=11.1°$, meaning that light in the fiber with an angle of less than 11.1° relative to the fiber axis can be retroreflected by TIR, or equivalently the reflector structure 110 may retroreflect light with a numerical aperture (NA) up to 0.28. Additionally, or alternatively, the reflector structure 110 may include two facets 112, four facets 112, or more than four facets 112, in which case the angular acceptance for TIR may be reduced relative to the beneficial angular acceptance for TIR that is provided by a corner-cube retroreflector with three mutually orthogonal facets. Accordingly, in designs where the reflector structure 110 has two facets 112, four facets 112, or more than four facets 112, a thin-film reflective coating may be applied to the facets 112 to improve reflectivity of the facets 112. Furthermore, in some implementations, the multiple facets 112 may have equal sizes, different sizes, equal angles relative to the axis of the optical fiber, and/or different angles relative to the axis of the optical fiber.

In general, the reflector structure 110 as illustrated in FIG. 1A will reflect most of the light delivered in the fiber (with the exception of light launched near the periphery of the fiber that may not be fully reflected). However, in the design illustrated in FIG. 1A, the reflector structure 110 has no output port. Accordingly, FIG. 1B illustrates an example in-fiber reflector structure 110 that includes a central pass-through port 114, where an incoming fiber section 140 may be a double-clad fiber, a triple-clad fiber, a multi-clad fiber, and/or the like coupled to one or more light sources. For example, the one or more light sources may be arranged to deliver cladding-guided light to be retroreflected (e.g., pump light that has made one pass through an active fiber), core-guided light (e.g., signal light) to be transmitted in a central core 130 that continues beyond the in-fiber reflector structure 110 into a downstream section 150 of the optical fiber, and/or the like. For example, as shown in FIG. 1B, an extended length of the optical fiber has been machined away, leaving a thin pass-through port section 130 that includes a central core to carry the signal from left to right, and the multi-faceted reflector structure 110 on the left half of the fiber 140. Cladding-guided light passing through the optical fiber may enter the incoming fiber section 140 from the left and may be retroreflected back to the left following bounces off of the multiple facets 112. Cladding-guided light located in the middle of the incoming fiber section 140 may not be retroreflected by the reflector structure 110, and may pass through the central pass-through port 114, which may have a diameter that is as small as possible to improve retroreflection efficiency. For example, in some implementations, the central pass-through port 114 may have a diameter in a range from 50 microns to 100 microns. In some implementations, the core-guided light can travel from left to right or from right to left. On the right side of FIG. 1B, the downstream fiber section 150 may revert to an original size, either in one step (e.g., as shown in FIG. 1B), or through a gradual taper. Additionally, or alternatively, another in-fiber reflector structure may be provided on the downstream fiber section 150, in which case the optical assembly shown in FIG. 1B may be retroreflective in both directions. Alternatively, in some implementations, there may be no substantial middle section of thinned pass-through fiber. For example, FIG. 1C illustrates an example of an in-fiber reflector structure 110 where the fiber may transition back up to full size immediately following the faceted reflector structure 110 without a substantial middle section of thinned pass-through fiber.

In some implementations, the reflector structure 110 as illustrated in FIGS. 1A-1C may be machined into an active fiber that is coupled to the one or more light sources. For example, in some implementations, the active fiber may include an optical fiber capable of generating laser amplification, such as a rare-earth-doped fiber, a bismuth-doped fiber, a Raman gain fiber, and/or the like. However, in cases where the reflector structure 110 is machined into an active fiber, there may be additional heating and/or stress due to absorption of the cladding-guided (e.g., pump) light near the reflector structure 110 that is machined into the active fiber. Accordingly, in some implementations, an optical assembly incorporating the reflector structure 110 may include an active fiber that is coupled to the one or more light sources, and a matching (or near-matching) passive fiber spliced downstream from (e.g., adjacent to) the active fiber. In this case, the reflector structure 110 may be machined into the passive fiber, which may reduce or eliminate heating and/or stress due to due to absorption of the cladding-guided light.

In some implementations, as described herein, the reflector structure 110 may be machined into any suitable optical fiber that includes a core in which core-guided light generated by one or more light sources propagates along a length of the optical fiber and one or more claddings, surrounding the core, to guide cladding-guided light generated by the one or more light sources along the length of the at least one optical fiber. For example, in some implementations, the optical fiber may be a double-clad optical fiber, a triple-clad optical fiber, a multi-clad optical fiber, and/or the like. In some implementations, retroreflective coupling efficiency may be improved in cases where the reflector structure 110 is machined into an optical fiber having a triple-clad or multi-clad structure (e.g., where the reflector structure 110 is machined into an optical fiber with more than one pump-guiding or cladding-guiding layer). For example, if incoming cladding-guided and/or core-guided light is substantially confined within a first pump-guiding or cladding-guiding layer (e.g., an inner cladding), then some of the retroreflected power that would otherwise escape the optical the optical fiber may be captured by a second pump-guiding or cladding-guiding layer (e.g., an outer cladding).

As indicated above, FIGS. 1A-1C are provided as one or more examples. Other examples may differ from what is described with regard to FIGS. 1A-1C. For example, the number and arrangement of components shown in FIGS. 1A-1C are provided as one or more examples. In practice, the arrangements shown in FIGS. 1A-1C may include additional components, fewer components, different components, or differently arranged components than those shown in FIGS. 1A-1C. Additionally, or alternatively, a set of components (e.g., one or more components) in FIGS. 1A-1C may perform one or more functions described as being performed by another set of components in FIGS. 1A-1C.

Figure 2:
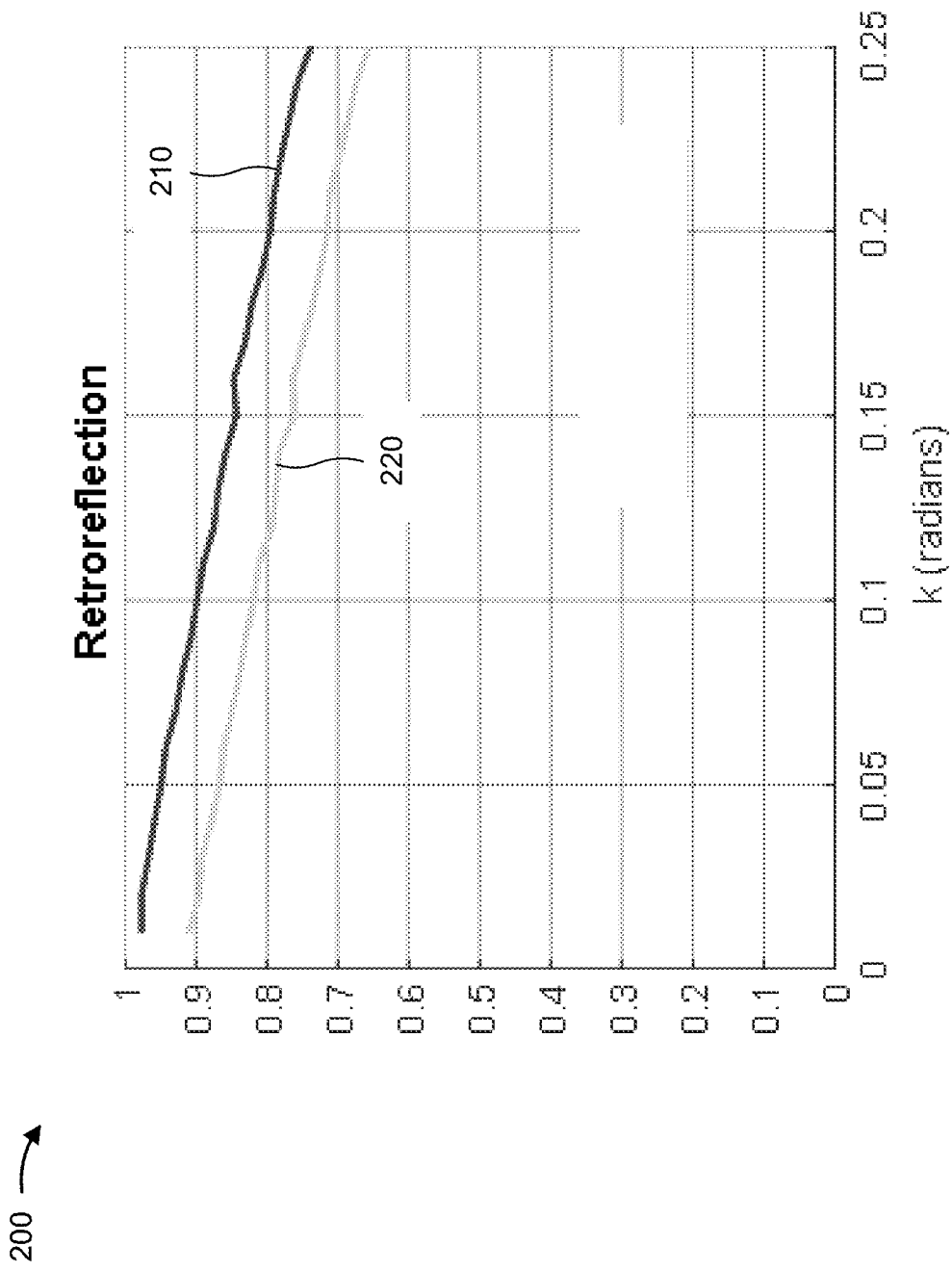
FIG. 2 is an example plot showing retroreflection efficiency as a function of input light divergence for a reflector structure machined into an optical fiber.

FIG. 2 is an example plot 200 showing retroreflection efficiency as a function of input light divergence for a reflector structure machined into an optical fiber (e.g., as shown in FIGS. 1A-1C and described in further detail above). For example, the example plot 200 illustrated in FIG. 2 is based on ray-trace calculations that indicate a fraction of light that is retroreflected by the reflector structure 110 in various cases. For example, in FIG. 2, curve 210 shows retroreflected efficiency as a function of the divergence of the input light in radians (roughly equivalent to numerical aperture (NA)) for a first in-fiber retroreflector used in a 500 micron diameter silica fiber with no output port (e.g., as shown in FIG. 1A). Furthermore, curve 220 shows retroreflected efficiency as a function of the divergence of the input light in radians for a second in-fiber retroreflector used in a 500 micron diameter silica fiber with a 100 micron diameter pass-through (e.g., as shown in FIGS. 1B-1C). Accordingly, the example plot 200 shown in FIG. 2 shows that the reflector structure does not retroreflect some of the light passing through the optical fiber. For example, in the case of the silica fiber with no output (e.g., curve 210), the loss may include a portion of the cladding-guided light located near the edge of the fiber that is not completely retroreflected, and in the case of the silica fiber with the 100 micron pass-through output (e.g., curve 220), there is some additional loss of cladding-guided light that entered the central pass-through port 114. Nonetheless, as shown in FIG. 2, reflection efficiency is relatively high even up to divergence angles as high as 0.25 radians (e.g., over ~65% for a reflector structure 110 with a 100 micron diameter pass-through, or over ~70% for a reflector structure 110 with no output port). Furthermore, minimizing the diameter of the central pass-through port 114, for example using a 50 micron diameter for the central pass-through port 114 instead of a 100 micron diameter as in the case of curve 220, would bring curve 220 closer to the "no output" case (curve 210) because there would be less loss due to cladding-guided light entering the central pass-through port 114.

As indicated above, FIG. 2 is provided as an example. Other examples may differ from what is described with regard to FIG. 2.

Figure 3:
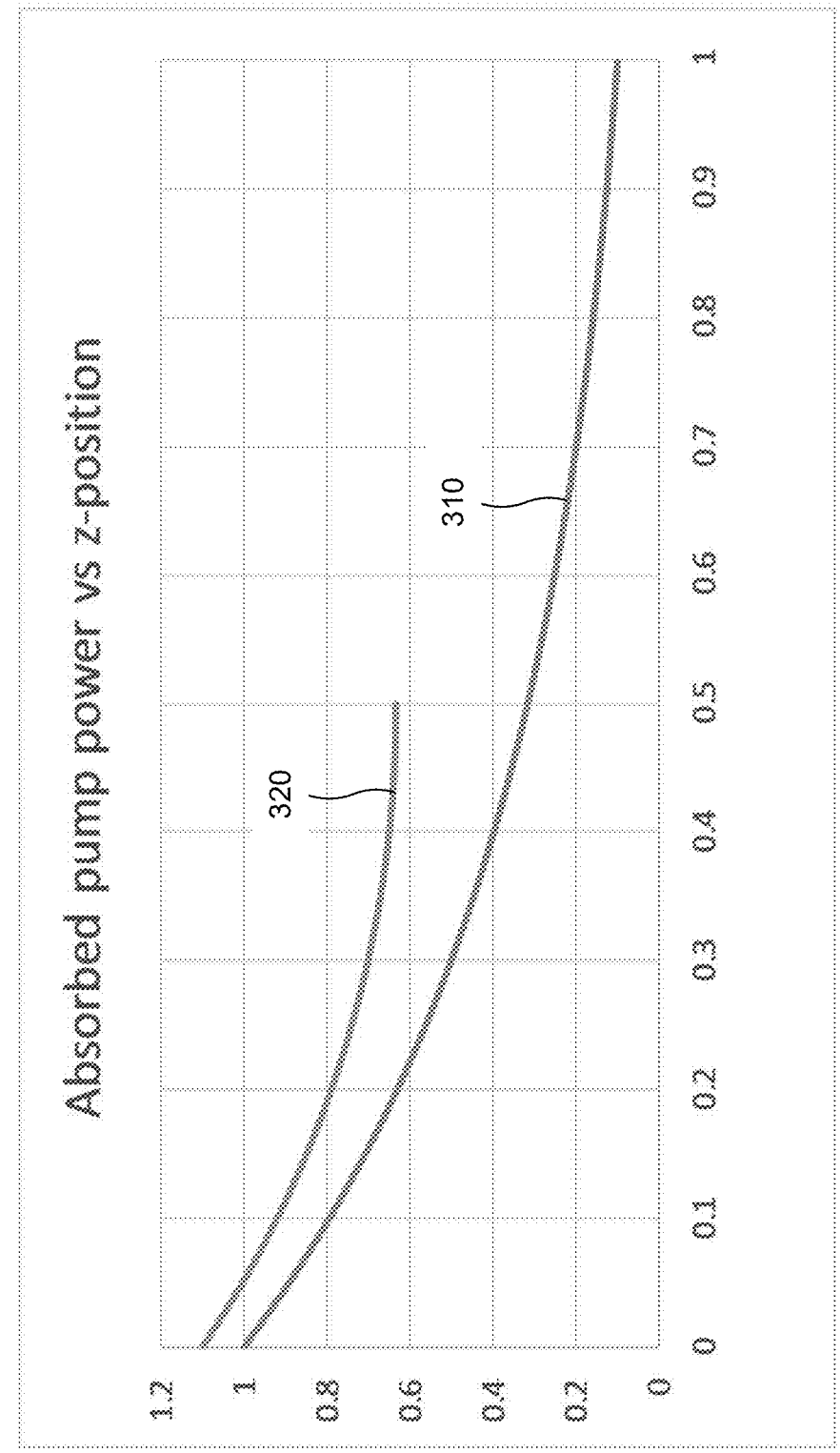
FIG. 3 is an example plot showing an absorbed pump power distribution for single-pass and double-pass pumping in an optical fiber.

FIG. 3 is an example plot 300 showing an absorbed pump power distribution for single-pass and double-pass pumping in an optical fiber.

More particularly, one important application of the in-fiber reflector structure(s) described herein is to reduce a length of an active fiber in a fiber laser in order to minimize fiber cost, maximize lasing efficiency, reduce nonlinear effects such as Stimulated Raman Scattering (SRS) and Stimulated Brillouin Scattering (SBS) that may otherwise limit operating power, and/or the like. In many fiber lasers, a required fiber length may be determined based on a rate of absorption of pump power into the core. Accordingly, by enabling double-passing of cladding-guided light (e.g., pump light), the in-fiber reflector structure(s) described herein can reduce the required fiber length and/or increase the absorption efficiency for a given fiber length. Furthermore, in some implementations, the in-fiber reflector structure(s) described herein minimize a variation in the absorbed pump power along the active fiber such that the fiber is more uniformly pumped. At multi-kW power levels, an important factor is to distribute the absorbed power well to avoid having some regions of the fiber suffering from excessive heat loads while others are underutilized. This effect is illustrated in the plot 300 shown in FIG. 3, which shows an absorbed pump power load as a function of position along an active fiber. For example, in FIG. 3, curve 310 represents the case of traditional single-pass pumping (e.g., where a cladding light stripper is used to remove cladding-guided light after a single pass through an optical fiber), and curve 320 represents an idealized case of double-pass pumping in which the in-fiber reflector structure(s) described herein enable 100% retroreflectivity.

In the example plot 300 shown in FIG. 3, the length of the single-pass arrangement shown by curve 310 is normalized to length one (1), with 90% absorption (10 dB), and the absorbed pump power is normalized to one (1) at launch of the single pass pump. The double-pass arrangement shown by curve 320 is designed to achieve the same 10 dB absorption using the same fiber, therefore using only half as much fiber as the single-pass arrangement. As shown in FIG. 3, and by curve 310, the absorbed power varies from 1 down to 0.1 in the single-pass arrangement, whereas curve 320 shows that the absorbed power varies from 1.1 (1 from the forward pump plus 0.1 from the retroreflected pump) down to 0.63 in the double-pass pump arrangement. This calculation shows a substantial improvement in uniformity of absorbed pump as well as a substantial savings of fiber length while achieving the same total pump absorption.

As indicated above, FIG. 3 is provided as an example. Other examples may differ from what is described with regard to FIG. 3.

Figure 4:
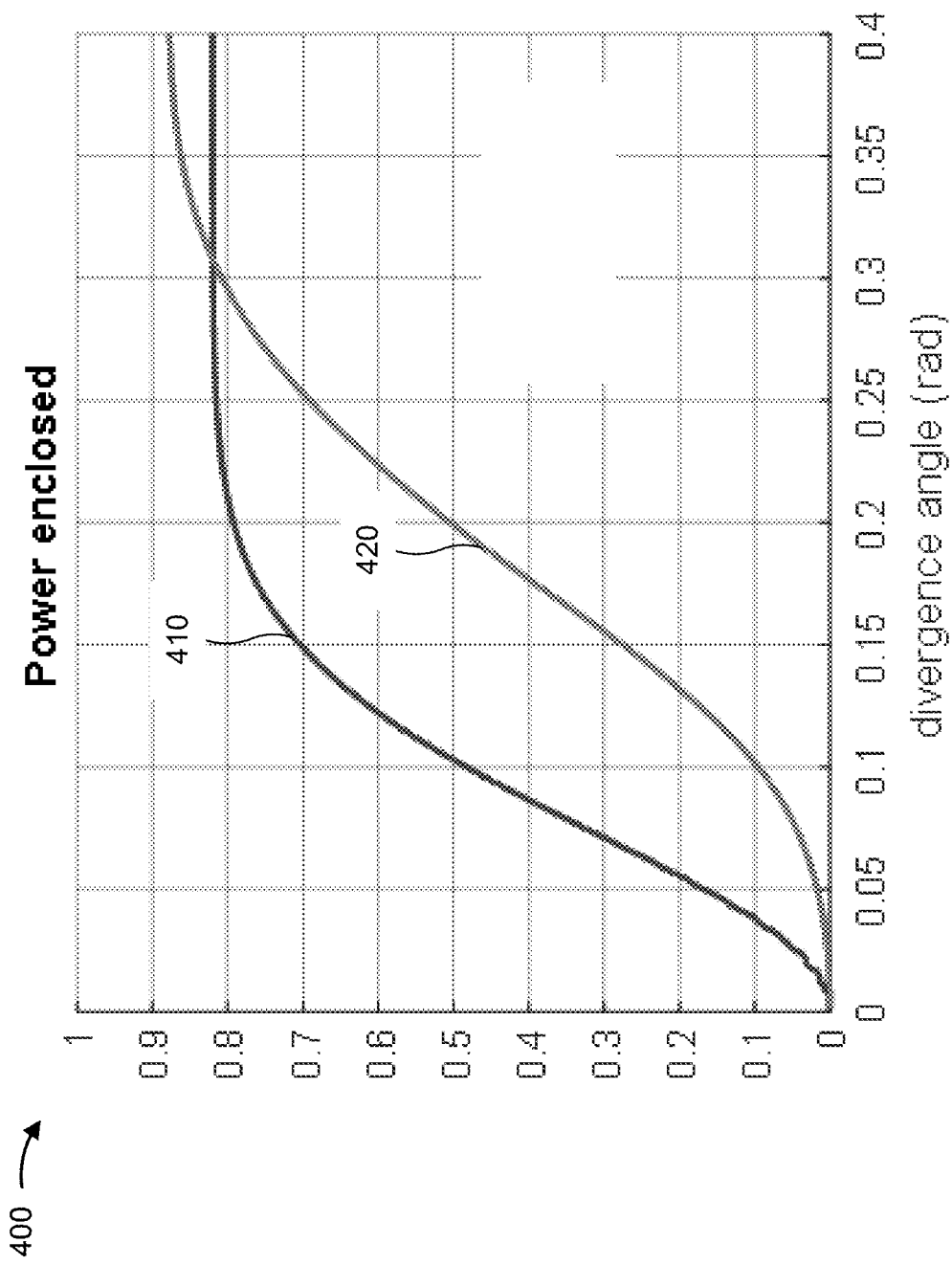
FIG. 4 is an example plot showing power enclosed in a beam that is retroreflected by a reflector structure machined into an optical fiber as a function of a divergence angle.

FIG. 4 is an example plot 400 showing power enclosed in a beam that is retroreflected by a reflector structure machined into an optical fiber as a function of a divergence angle.

More particularly, in FIG. 4, curve 410 represents the case of a reflector structure that has three (3) facets arranged at an angle $\theta$ relative to the axis of an optical fiber such that sin $\theta=1/\sqrt{3}$ (e.g., $\theta \approx 35.3°$). In this case, the three facets of the reflector structure may be mutually orthogonal and may form a corner-cube retroreflector with TIR, as described above. In this case, excluding a small proportion of cladding-guided light that leaks out from the periphery of the optical fiber, substantially all of the light that is captured by the reflector structure is reflected back in an opposite direction to make a second pass through the optical fiber. In this way, there may be substantially no loss in brightness in the light that is reflected backwards. In other words, if the light captured by the reflector structure comes in at a certain angle, a corner-cube retroreflector design causes the light to be reflected back on the same angle.

Accordingly, curve 410 illustrates the case of an optimal (e.g., lowest possible) divergence angle, but the total reflected power is capped at around 82% such that approximately 18% of incoming light is lost after the first pass through the optical fiber. As further shown in FIG. 4, curve 420 illustrates the case of a reflector structure in which the three (3) facets are shifted downward from the corner-cube design by 1.5° such that $\theta \approx 35.3°-1.5° \approx 33.8°$. In this case, the total reflected power can be increased from ~82% to ~88%, at a cost in divergence angle of the reflected light increasing from ~0.25 radians to ~0.4 radians. In other words, adjusting the angle of the facets relative to the axis of the optical fiber may allow the reflector structure to capture more light than the corner-cube design, but at a cost as curve 420 is shifted to the right relative to curve 410, meaning that the light being reflected backwards has a higher divergence angle. Accordingly, the angle of the facets of the reflector structure may be tailored to balance a tradeoff between a perfect corner-cube design with a minimal divergence angle and other angles that enable more light to be captured without increasing the divergence angle beyond acceptable bounds (e.g., the divergence angle should not be so high that some of the reflected light is unable to be guided by the double-cladding index layer).

As indicated above, FIG. 4 is provided as an example. Other examples may differ from what is described with regard to FIG. 4.

Figure 5:
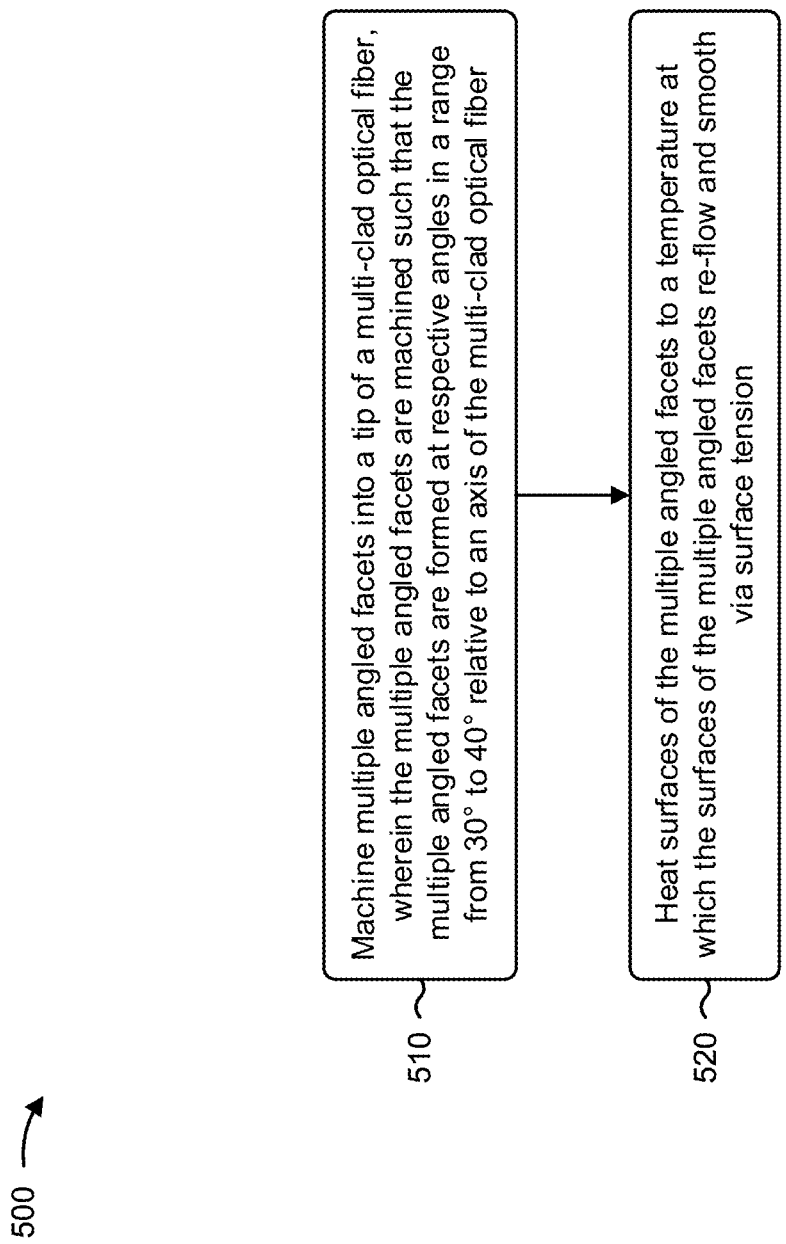
FIG. 5 is a flowchart of an example process for manufacturing an optical assembly that includes a reflector structure machined into an optical fiber.

FIG. 5 is a flowchart of an example process 500 for manufacturing an optical assembly that includes a reflector structure machined into an optical fiber.

As shown in FIG. 5, process 500 may include machining multiple angled facets into a tip of a multi-clad optical fiber, wherein the multiple angled facets are machined such that the multiple angled facets are formed at respective angles in a range from 30° to 40° relative to an axis of the multi-clad optical fiber (block 510). For example, in some implementations, the multiple angled facets may be machined into the tip of the multi-clad optical fiber using a short-pulse laser (e.g., a nanosecond laser, a picosecond laser, a femtosecond laser, and/or the like). Additionally, or alternatively, the multiple angled facets may be machined into the tip of the multi-clad optical fiber using a carbon dioxide ($CO_2$) laser. Furthermore, in some implementations, the short-pulse or $CO_2$ laser used to machine the multiple angled facets into the tip of the multi-clad optical fiber may be operated in a tangential machining mode in order to carve the multiple angled facets with a beam edge. Additionally, or alternatively, the angled facets may be machined into the tip of the multi-clad optical fiber using non-laser machining processes, such as precision filing, grinding, polishing, waterjet machining using diamond grit, wet or dry etching, and/or the like. In general, after the facets are machined into the tip of the multi-clad optical fiber, the facets may have slightly rough surfaces. However, the facet surfaces generally need to have a shiny or glossy surface in order to retroreflect cladding-guided and/or core-guided light passing through the multi-clad optical fiber.

Accordingly, as further shown in FIG. 5, process 500 may further include heating surfaces of the multiple angled facets to a temperature at which the surfaces of the multiple angled facets re-flow and smooth via surface tension (block 520). For example, in some implementations, the surfaces of the multiple angled facets may be heated (e.g., fire-polished) using a flame torch, an electric arc, an electric filament, a $CO_2$ laser, and/or the like. Additionally, or alternatively, the surfaces of the angled facets may be smoothed using other techniques, such as wet or dry etching. In some implementations, the surfaces of the facets may be slightly rounded or distorted after the smoothing process, but the rounding or distortion does not significantly degrade performance of the reflector structure. In this way, heating the (slightly rough) machined area may load the facet surfaces such that the facet surfaces will have a smooth, shiny, and glossy finish after the surfaces cool down and harden. In this way, the smooth surfaces of the facets may retroreflect at least a portion of core-guided and/or cladding-guided light that is unabsorbed following a first pass through the multi-clad optical fiber such that the retroreflected light can make a second pass through the multi-clad optical fiber.

Process 500 may include additional implementations, such as any single implementation or any combination of implementations described below and/or in connection with one or more other processes and/or implementations described elsewhere herein.

For example, following fabrication, the reflector structure may be packaged in a strain-relieved, sealed package to avoid breakage, ensure cleanliness, and/or the like. In some implementations, a downstream portion of the reflector structure may be recoated in a polymer. In some implementations, the TIR facets may remain exposed to the air in order to maintain TIR performance. Additionally, or alternatively, the TIR facets may be coated with a reflective thin-film coating, in which case the TIR facets may similarly be recoated (e.g., in a polymer).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An optical assembly, comprising:
one or more light sources; and
at least one optical fiber that comprises:
    a core in which core-guided light generated by the one or more light sources propagates along a length of the at least one optical fiber;
    one or more claddings, surrounding the core, to guide cladding-guided light generated by the one or more light sources along the length of the at least one optical fiber; and
    a reflector structure machined into the at least one optical fiber, wherein the reflector structure comprises multiple angled facets that are arranged at one or more respective angles relative to an axis of the at least one optical fiber to reflect at least a portion of one or more of the core-guided light or the cladding-guided light passing through the at least one optical fiber,
        wherein the reflector structure comprises a central pass-through port to transmit at least a portion of the core-guided light into a downstream section of the at least one optical fiber.

2. The optical assembly of claim 1, wherein the multiple angled facets comprise three angled facets that are each arranged at an angle in a range from 30° to 40° relative to the axis of the at least one optical fiber.

3. The optical assembly of claim 2, wherein the angle is an angle $\theta$ such that $\sin \theta = 1/\sqrt{3}$ and such that the three angled facets are mutually orthogonal.

4. The optical assembly of claim 1, wherein the at least one optical fiber comprises:
an active fiber coupled to the one or more light sources; and
a passive fiber spliced downstream from the active fiber, wherein the reflector structure is machined into the passive fiber.

5. The optical assembly of claim 1, wherein the at least one optical fiber comprises an active fiber coupled to the one or more light sources, and wherein the reflector structure is machined into the active fiber.

6. The optical assembly of claim 1, wherein the multiple angled facets comprise two, four, or more than four angled facets that have a thin-film reflective coating.

7. The optical assembly of claim 1, wherein the multiple angled facets have equal sizes and are arranged at equal angles relative to the axis of the at least one optical fiber.

8. The optical assembly of claim 1, wherein at least two of the multiple angled facets have different sizes or are arranged at different angles relative to the axis of the at least one optical fiber.

9. The optical assembly of claim 1, wherein the multiple angled facets comprise a dichroic coating such that the portion of the core-guided light or the cladding-guided light that is reflected by the reflector structure includes wavelengths in a first range, and such that a second portion of the core-guided light or the cladding-guided light that includes wavelengths in a second range is not reflected.

10. A reflector structure, comprising:
multiple angled facets machined into a tip of a multi-clad optical fiber, wherein the multiple angled facets are arranged at an angle in a range from 30° to 40° relative to an axis of the multi-clad optical fiber to reflect at least a portion of one or more of core-guided light or cladding-guided light after a first pass through the multi-clad optical fiber; and a central pass-through port, formed at a junction of the multiple angled facets, to transmit at least a portion of the core-guided light into a downstream section of the multi-clad optical fiber.

11. The reflector structure of claim 10, wherein the central pass-through port has a diameter in a range from 50 microns to 100 microns.

12. The reflector structure of claim 10, wherein the downstream section of the multi-clad optical fiber comprises a pass-through portion in which one or more claddings surrounding the core are machined away.

13. The reflector structure of claim 12, wherein the downstream section of the multi-clad optical fiber reverts to an original size of the multi-clad optical fiber downstream from the pass-through portion.

14. The reflector structure of claim 10, wherein the angle is $\sin^{-1}(1/\sqrt{3}) \approx 35.3°$ such that the multiple angled facets are mutually orthogonal and the reflector structure forms a corner-cube retroreflector with total internal reflection.

15. A method, comprising:
machining multiple angled facets into a tip of a multi-clad optical fiber, wherein the multiple angled facets are machined such that the multiple angled facets are formed at respective angles in a range from 30° to 40° relative to an axis of the multi-clad optical fiber, wherein the multiple angled facets are arranged to reflect at least a portion of one or more of core-guided light or cladding-guided light passing through the multi-clad optical fiber, wherein, at a junction of the multiple angled facets, the multiple angled facets comprise a reflector structure that comprises a central pass-through port to transmit at least a portion of the core-guided light into a downstream section of the multi-clad optical fiber.

16. The method of claim 15, wherein the multiple angled facets are machined into the tip of the multi-clad optical fiber using a short-pulse or carbon dioxide laser.

17. The method of claim 16, wherein the short-pulse laser or carbon dioxide laser is operated in a tangential machining mode to carve the multiple angled facets with abeam edge.

18. The method of claim 15, further comprising:
causing surfaces of the multiple angled facets to re-flow and smooth via surface tension.

19. The method of claim 15, further comprising:
coating the multiple angled facets with a reflective thin-film coating.

20. The method of claim 18, wherein the surfaces of the multiple angled facets are heated using one or more of a flame torch, an electric arc, an electric filament, or a carbon dioxide laser.

* * * * *